United States Patent [19]
Müller

[11] 3,873,897
[45] Mar. 25, 1975

[54] COLLECTOR-LESS D-C MOTOR

[75] Inventor: Rolf Müller, Saint Georgen, Germany

[73] Assignee: Papst-Motoren KG, Black Forest, Germany

[22] Filed: May 23, 1973

[21] Appl. No.: 363,290

[30] Foreign Application Priority Data

| May 25, 1972 | Germany | 2225442 |
|---|---|---|
| Oct. 27, 1972 | Germany | 2252727 |
| Dec. 8, 1972 | Germany | 2260069 |
| Mar. 22, 1973 | Germany | 2314259 |

[52] U.S. Cl. ............ 318/138, 318/254, 310/172, 310/192, 310/193
[51] Int. Cl. ......................................... H02k 29/00
[58] Field of Search ............ 318/138, 254; 310/172, 310/192, 193

[56] References Cited
UNITED STATES PATENTS

| 3,264,538 | 8/1966 | Brailsford | 318/138 |
|---|---|---|---|
| 3,486,099 | 12/1969 | Brunner et al. | 318/138 X |
| 3,517,289 | 6/1970 | Brunner et al. | 318/138 |
| 3,541,408 | 11/1970 | Schwendtner et al. | 318/138 |
| 3,652,909 | 3/1972 | Rainier | 318/138 X |

*Primary Examiner*—G. Z. Rubinson
*Attorney, Agent, or Firm*—Flynn & Frishauf

[57] ABSTRACT

A permanent magnet rotor operates within the air gap of a stator magnetic circuit which has a stator winding. Current through the winding is controlled by a selectively energized semiconductor switch, which is energized over a portion of rotor rotation and in synchronism therewith. The air gap included in the magnetic circuit is non-uniform along its length, increasing to a maximum intermediate the extent of a pole, for example between 10 to 50 electrical degrees, and then decreasing to a minimum over the remainder to 180 electrical degrees over a pole. The winding is energized to cause rotation of the rotor while the permanent magnet is within a predetermined angular range, resulting in storage of magnetic energy which is released as torque upon further rotation of the rotor in another angular range. The timing of energization of the winding by a control circuit can be used to control motor speed.

35 Claims, 6 Drawing Figures

COLLECTOR-LESS D-C MOTOR

CROSS REFERENCE TO RELATED APPLICATION

U.S. Ser. No. 363,291 filed May 23, 1973.

The present invention relates to a collector-less direct current (d-c) motor having a permanent magnet rotor which operates in an air gap, preferably an axial air gap, and in which the motor winding is intermittently energized to generate a torque, the air gap being non-uniform over its circumferential extent so that, in addition to rotation, energy will be stored in the magnetic circuit which is released when the winding has been de-energized.

Collector-less d-c motors have been previously proposed. In one proposed construction, four separately controlled windings are provided in order to generate a rotating field (see: "Siemens-Zeitschrift"1966, pages 690–693). For collector-less operation, two Hall generators and at least four power transistors are needed.

It is an object of the present invention to provide a collector-less d-c motor which is simple, requires few expensive components and which can be easily controlled in a simple control circuit.

SUBJECT MATTER OF THE PRESENT INVENTION

Briefly, the air gap is made variable over the sector, or extent of the pole, looked at in the direction or rotation, in that the air gap increases (beginning from the pole) throughout a first angular range up to a maximum; in a second angular range, the air gap then decreases to a minimum. Upon rotation of the rotor, magnetic energy is first stored and this magnetic energy is then released during interruption of current through the stator winding, so that further driving torque is obtained from the motor.

Motors of this type can readily be combined with control circuits which provide speed regulation. If such speed regulation is desired, then current through the windings must be accurately controlled and be applied exactly at that time when the voltages induced in the windings by the permanent magnet rotor have a maximum, that is, when stator and rotor poles are displaced by roughly 90 electrical degrees (hereinafter: "°-el."). To improve efficiency and to obtain smooth operation and vibration-free running, current should be supplied to the windings preferably only roughly in that time range, that is, when there is a displacement by 90°el. between stator and rotor pole — which means that current will flow only during a relatively short period of time during any rotor revolution. Thus, the gaps in torque derived from the power applied to the motor are substantial.

The present invention thus has a further object to provide a motor adapted for operation with a speed control circuit and which provides for relatively uniform torque at the output of the motor, in spite of substantial gaps in power applied to the winding when operating at the desired speed.

In accordance with a feature of the present invention, the minimum air gap is located in advance of the end of the pole sector, by a third angle which may be quite small and in some cases zero, and the decrease in size of the air gap is essentially uniform. With a suitable control circuit, the desired uniform torque applied by the rotor at controlled speed is obtained throughout the entire revolution of the rotor.

The invention will be described by way of example with reference to the accompanying drawings, wherein.

Figure 1:
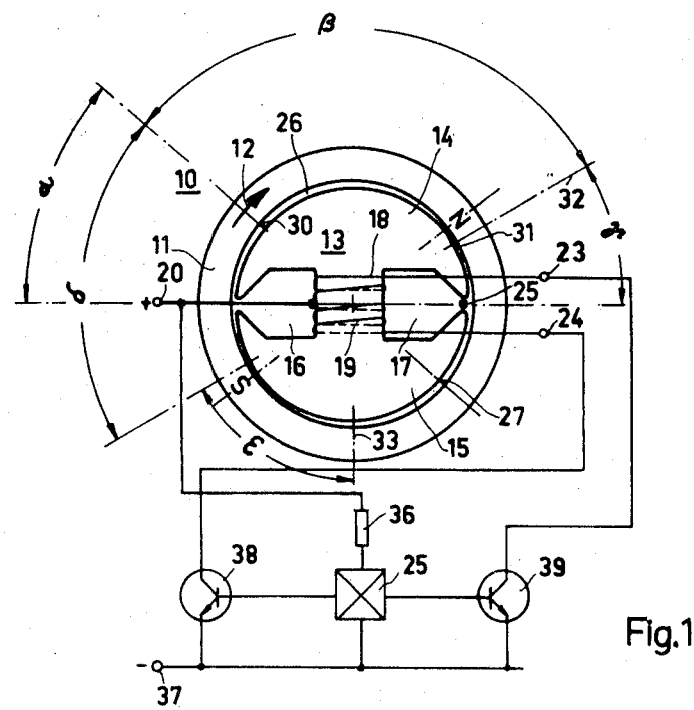
FIG. 1 is a schematic cross-sectional view of a two-pole external rotor motor, and associated circuitry.

The external rotor motor 10 of FIG. 1 has an outer permanent magnetic two-pole rotor 11, which is magnetized to have an approximately sinusoidal, or trapeze-shaped magnetic field distribution. In operation, the motor rotates in direction of arrow 12. Rotor 11 is shown in its quiescent or stop position, which is also its starting position, determined essentially by the geometry of the magnetic circuit.

Stator 13 of motor 10 is a salient pole double-T armature, having an upper pole 14 and a lower pole 15, both extended circumferentially over an extended arc or sector, covering almost an entire semi-circle. The armature is formed with two slots 16, 17 in which a single winding is placed formed of two winding halves 18, 19, with a center tap connected to positive terminal 20. The free ends of the winding halves 18, 19 are shown at terminals 23, 24. A Hall generator, or any equivalent galvanomagnetic commutation element or sensor is located at the edge of the slot 17, or at any electrically equivalent position of the stator 13.

The stator and rotor are separated by an air gap. The air gap portion 26 above the pole 14, and the air gap 27 opposite pole 15 are, in accordance with the invention, shaped in a specific manner. In accordance with the invention, the effective air gap is varied, so that the various angular or arcuate positions have a specific air gap size. This effective air gap can be formed at the various angular position, for example by stator laminations of non-uniform, or uneven diameter in such a way that the effective average air gap, at any angular position, is dimensioned in accordance with the principle of the present invention.

Figure 2:
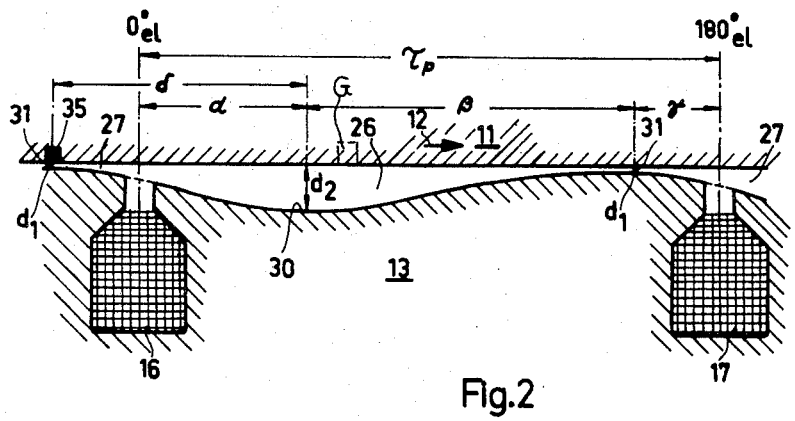
FIG. 2 is a highly schematic developed view of the air gap of the upper pole arc, or sector, of the motor of FIG. 1.

The air gap 26 is shown, developed, in FIG. 2. It is symmetrical with air gap 27. Rotor 11 and stator 13 are also illustrated — developed — in FIG. 2, the arc of the stator covering 180°-el. Starting from winding slot 16, air gap 26 increases over a first angular range $\alpha$, extending, for example from 10° to 100°-el. It increases essentially uniformly to a position 30, at which point the maximum value $d_2$ of air gap 27 is reached. Air gap 26 then decreases over a second angular range $\beta$, extending for example 80°-el. to 160°-el., decreasing uniformly, or non-linearly to a position 31 at which the minimum value $d_1$ of the air gap 26 will appear. Position 31 is located by an angle $\gamma$ in advance of slot 17. This angle $\gamma$ may have from 0° to 50°-el. If $\gamma$ equals zero, then the relatively great decrease in induction directly above the opening of slot 16, or 17, respectively, can be compensated in part. The position of minimum air gap 31 may, therefore, be placed directly in advance of the slot 17, so that the angle $\gamma = 0$.

Starting at position 31, the air gap then increases (it will become air gap 27) uniformly — except for the interruption due to the slot 17 — over a fourth angular range δ, extending for example from 20°-el. to 100°-el., increasing monotonously, or uniformly to point 30 opposite the adjacent pole. Stator 13, in cross section, will have roughly the form of an ellipse, the main axis 32 of which is offset by an angle ε, which is approximately 40°-el. to 80°-el. with respect to the axis 33 passing through the center line of the two poles 14, 15.

OPERATION

Let it be assumed that the stator 13 is an ideal magnetic circuit, that is, does not have the interruptions due to slots 16, 17; let it further be assumed that, at a given position, for example at point 35, a concentrated magnetic pole such as the north pole is placed. This concentrated pole 35 will assume the position shown in FIG. 2, when in quiescent or steady state position, that is, at the point at which the opposed air gap is a minimum, that is, at position 31 of the air gap. To turn the pole 35 in direction of arrow 12 requires energy, since the air gap opposite pole 35 increases. This torque is generated by current in the winding 18, or 19, respectively, in operation, approximately over the angular range δ.

After pole 35 has passed the position 30, that is, maximum air gap of dimension $d_2$, the rotor 11 is then driven by the reluctance torque and the energy stored in the magnetic circuit is released or delivered, so that no electrical torque need be provided during this portion of rotation of the rotor. This condition will pertain until position 31 at the next pole is reached, at which point the cycle will repeat. In actual practice, the magnetic pole 35 is not concentrated, but rather, the two poles of the rotor 11 will have a linear extent. They may be magnetized according to a square wave, trapeze-shaped, or sinusoidal (with respect to circumferential extent). A trapezoidal magnetization is preferred and used for all embodiments. Due to the length of magnetization, the reluctance torque will not be delivered in accordance with the shape of the air gap. For purposes of explanation, the two magnetic poles of the rotor 11 may, however, be considered to consist of various highly concentrated magnetic poles distributed around a rotor circumference. The actual torque distribution is obtained by superimposing the torques generated by these concentrated poles at any time, which torque is determined by the type of magnetization of the rotor as well as by the shape of the air gap and its linear width, with respect to arcuate extent. In actual practice, the angles α to δ, as well as the dimensions $d_1$ and $d_2$ are best determined by simple experimentation. Suitable values for the various angles have been given above.

Current in windings 18 and 19 is controlled, in dependence on the position of the pole of rotor 11, by a Hall generator 25. Its control terminal is connected over a resistor 36 with positive terminal 20; its other terminal is connected to negative bus 37 of a direct current source, for example of 24 V. The two outputs of the Hall generator 25 are connected with the bases of a pair of npn transistors 38, 39, the emitter of which is connected to negative bus 37, whereas the collector of the transistor 38 connects with terminal 24 of the winding 19, and the collector of transistor 39 connects with the terminal 23 of winding 18. As the poles of rotor 11 pass the Hall generator 25, the one or the other transistor is gated to conduction during a predetermined angular range. The Hall generator 25 effects commutation, in the circuit of FIG. 1, between time periods 0°-el., 180°-el., 360°-el., etc. Current in one transistor (for example 38) is turned off when the current in the other transistor (e.g. 39) is turned on. The effective angle during which current flows in one of the two transistors, actually, is less than 180°-el. due to the commutation switching time, and is for example 160°-el. At the commutation instant, a small gap in torque will result.

Figure 3:
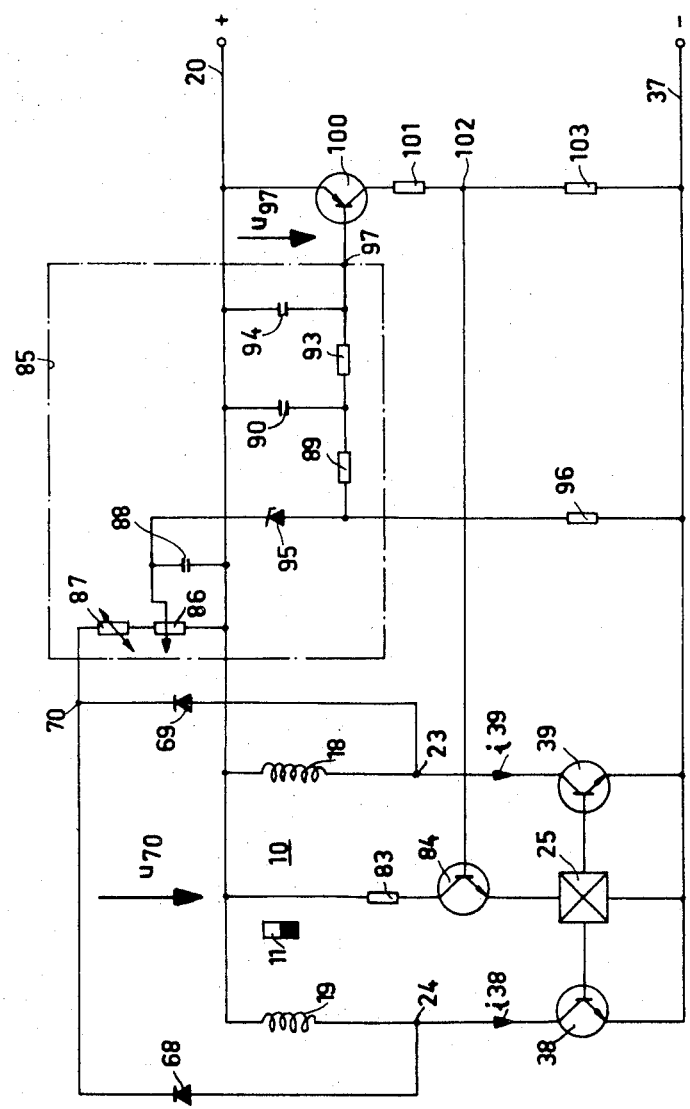
FIG. 3 is a schematic control circuit for speed regulation of the motor of FIG. 1.
Figure 4:
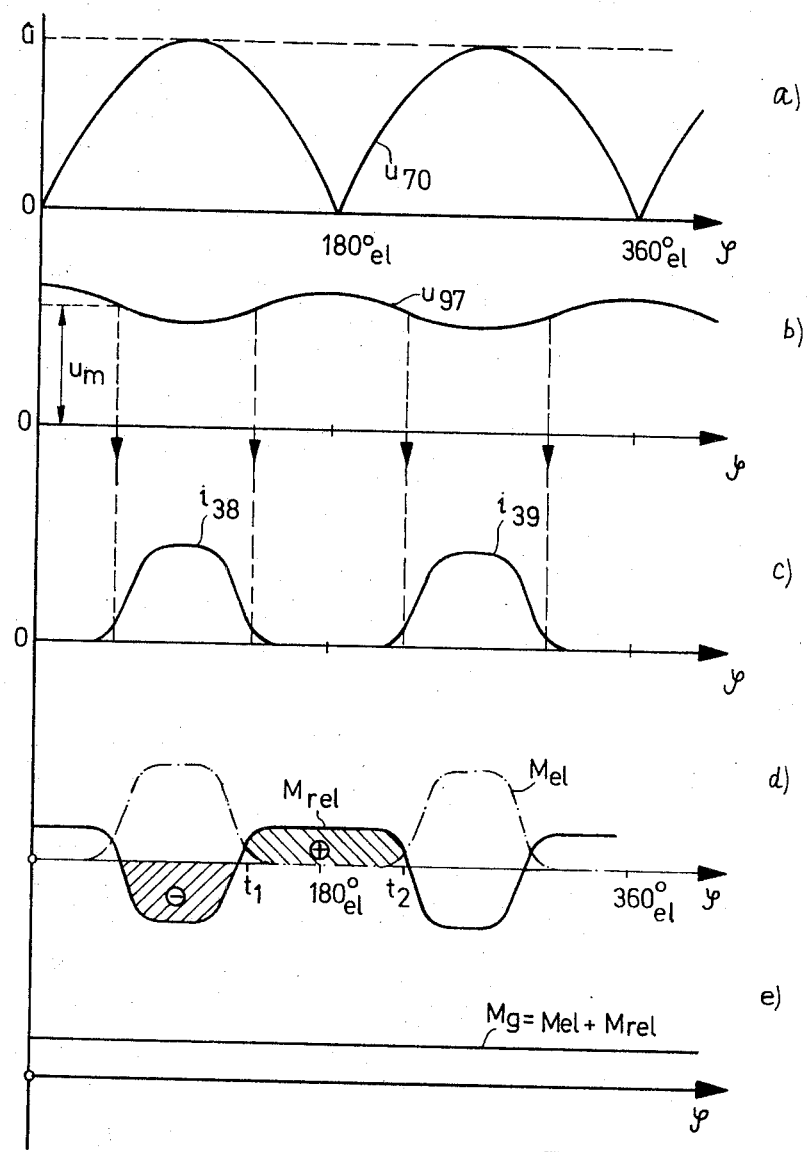
FIG. 4 shows a plurality of graphs, taken with respect to angular rotor displacement on the abscissa.

An uncontrolled network, as illustrated in FIG. 1, will have a turn-on angle for the transistors 38, 39, which is relatively large, for example about 160°-el. For motor control, it is desirable to make this angle smaller and to permit current to flow in the windings 18, 19 only during the relatively short duration of travel through a smaller angle, for example 120°-el. or less. If current flows only during a shorter angular range, the reluctance torque must be effective over a relatively large angular range, in order to completely fill the torque due to the electromagnetic drive. The actual structure of motors, in accordance with the present invention as described in the foregoing example, particularly the values of the angles β and δ have to be specifically matched to this case. These motors, if operated in accordance with the circuit of FIG. 1, should have a small angle δ and a relatively large angle β, if the rotor poles have trapezoidal magnetization. In contrast, motors adapted for operation with a speed control circuit of the type described in connection with FIG. 3 should have a relatively large angle δ and a relatively small angle β, for optimum results. FIG. 3 illustrates a control circuit in accordance with the present invention. Terminals 23, 24 of the two windings 18, 19 are connected to two diodes 69, 68, respectively, the cathodes of which are connected to a common line 70. In operation, a half-wave rectified voltage $u_{70}$ will be obtained, having an amplitude representative of the speed of rotor 11 (FIG. 4, graph a).

Resistor 39 (FIG. 1) is replaced by resistor 83, connected in series with the emitter-collector path of a transistor 84.

Voltage $u_{70}$ is connected to a phase shift network 85, which is in form of a filter network. The input to circuit 85 is a voltage divider formed of a resistor 87 and a potentiometer 86. Resistor 87 is a negative temperature coefficient resistor, included in the circuit to compensate for the temperature dependent remanent induction of the rotor 11. This induction decreases with increasing temperature.

The phase shift filter 85 has three series connected R-C circuits, formed of resistors 86, 87, 89, 93, and capacitors 88, 90, 94. A Zener diode 95 is placed between capacitor 88 and capacitor 90. The anode of Zener diode 95 is connected to negative line 37 over a resistor 96. The Zener diode shifts the voltage at bus 70 in negative direction by a fixed value. The normal voltage of line 70, in operation, is more positive than the voltage of the positive bus 20. The voltage at the anode of the Zener diode 95 will thus be less than the voltage of line 20. The filter and phase shifting network 85 has a dual effect; for one, a phase shift of the phase of the voltage $u_{70}$ (FIG. 4, graph a) by about 180° will be effected. It has been observed that the capacitors may have a substantial tolerance. Additionally, the highly wavy voltage $u_{70}$ is damped or smoothed, so that at output 97 a voltage $u_{97}$ (FIG. 4, graph b) is obtained. The value and phase position of voltage $u_{97}$ is determined by the values of the components of the filter and phase shift network 85.

Voltage $u_{97}$ is applied to the base of a pnp transistor 100, the emitter of which is connected to positive line 20. Its collector is connected over a resistor 101 with a junction 102, from which a resistor 103 connects to negative line 37. Junction 102 is connected to the base of transistor 84.

If point 97 becomes more negative than positive line 20, transistor 100 and with it the connected npn transistor 84 becomes conductive. Since the voltage $u_{97}$ will be only slightly wavy, the turn-on and turn-off switching can be very soft, resulting in current flow through windings 18, 19 formed by current $i_{38}$, $i_{39}$, respectively, as illustrated in graph FIG. 4, line c. The motor will thus operate quietly, with little switching transients or interferences upon connection and disconnection of current through the windings, and little disconnecting peaks. The efficiency is excellent, since the windings, as can be seen from the graph, will receive current when the voltage is a maximum. Suitable dimensioning of the filter and phase shift network 85 can be used to make the switching change-over of transistors 38, 39 more rapid in order to decrease losses in the transistors 38, 39.

Operation of circuit of FIG. 3: If the speed of motor 10 is below a desired value, as commanded by the setting of the potentiometer 86, then the induced voltage $u_{70}$ will have a relatively smaller amplitude. The d-c voltage portion of the smooth, phase-shifted $u_{97}$, illustrated at $u_m$ in FIG. 4, graph b, will be relatively small, so that transistor 100 will receive at its base a voltage which is more negative than the voltage of line 20 almost for the entire time period. Transistor 100, and therefore transistor 84 are constantly, or almost constantly conductive so that the armature current will switch between winding halves 18, 19, as discussed above in connection with FIG. 1, essentially under control of Hall generator 25. When the desired speed of the motor is reached, then the d-c voltage portion $u_m$ will increase so that the base of transistor 100 will, during some period of time, become more positive than its emitter. During this period both transistors 100 and 84 will be blocked, and Hall generator 25 cannot deliver a Hall voltage, so that transistors 38, 39 will likewise remain blocked. When the voltage $u_{97}$, due to the remaining waviness, drops so that the base of the transistor 100 will be negative relative to its emitter, transistor 100 will become conductive, causing conduction of transistor 84, so that Hall generator 25 will be energized and, in dependence on the then existing magnetic field of rotor 11, either transistor 38 or transistor 39 will be conductive. The current curves will result which are seen in FIG. 4, graph c. Hall generator 25 thus acts, effectively, like and AND-gate; it logically interconnects the information determined by the direction of magnetic flux from rotor 11 with the information derived from transistor 100. Commutation of current from transistor 38 to transistor 39, and vice versa, will therefore — at controlled speed — occur no longer at periods of time 0°-el., 180°-el., 360°-el., etc. (FIG. 4). Rather, current $i_{38}$ will terminate at approximately 140°-el., and current 39 will begin only at about 220°-el., since at 140°-el., the current supply to Hall generator 25 was interrupted by the controller, the current supply being connected only at about 220°-el.

Thus, the Hall generator alone no longer controls the commutating time, as in FIG. 1.

If the speed increases further, transistors 100 and 84 are practically constantly blocked, and motor 10 will receive little or no electromagnetic energy, so that its speed will again decrease.

The control in accordance with the present invention influences the width, or the intensity of the current pulses. The dynamics of control are excellent and the motor is controlled rapidly, without hunting, and without overshoots. The efficiency is also excellent, since the current pulses in windings 18 and 19 will have the correct phase position with respect to induced voltage $u_{70}$, and are relatively short, e.g. approximately 120°-el.

Currents $i_{38}$ and $i_{39}$, flowing in the windings 19, 18, respectively, cause an electromagnetic torque $M_{el}$, as seen in FIG. 4, graph d in chain-dotted lines. This torque, as can be seen, is interrupted by substantial gaps. These gaps are filled by the reluctance torque $M_{rel}$, generated as above described, as shown in FIG. 4, graph d. The illustrated and described shape of the air gap will have the effect that the torques $M_{el}$ and $M_{rel}$ are roughly the mirror images of each other, so that the reluctance torque falls in the gaps of the electromagnetic torque $M_{el}$, that is, between time periods $t_1$ and $t_2$ (FIG. 4 - d), to provide an overall output torque which is effectively constant. This is important since a practically constant torque to the motor is then obtained over an entire full rotation of the rotor. If the two torques $M_{el}$ and $M_{rel}$ are added, the total overall torque $M_u$ is obtained, see graph FIG. 4 - e. This torque, by suitable dimensioning of the air gap and of the control of the current through the windings can be essentially constant. This overall torque can be pre-set for the motor, that is, a motor of this type can be used to drive apparatus which requires a torque which it can deliver, that is, it may be used, for example for a fan, ventilator, a printer, as drive motor for tape recorders, record changers and turntables and the like. As seen in FIG. 3, the speed control for a motor of this type requires but little in the way of components, and is simple to construct and assemble.

Figure 5:
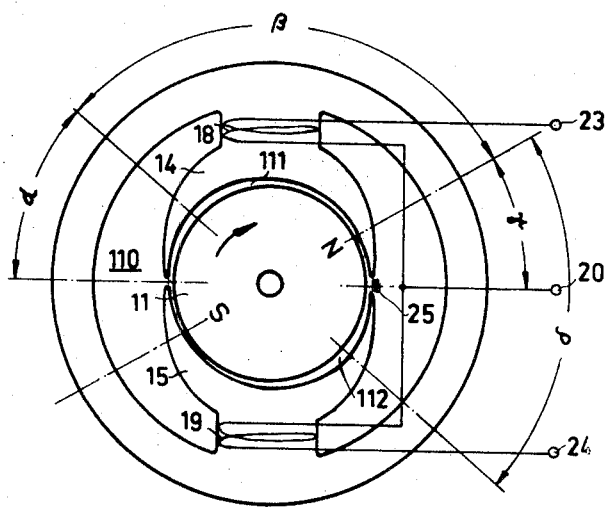
FIG. 5 is a schematic cross-sectional view of a two-pole internal rotor motor, constructed in accordance with the present invention.
Figure 6:
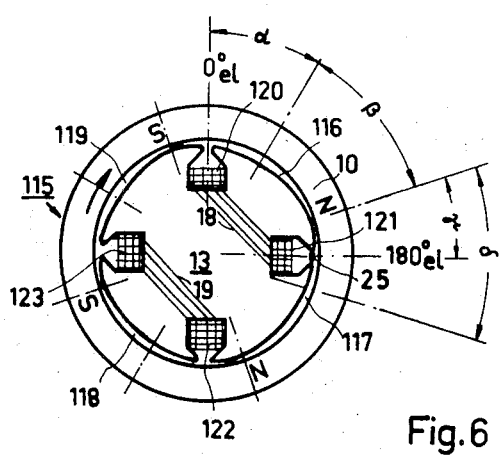
FIG. 6 is a schematic cross-sectional view of a four-pole external rotor motor.

The principle of the present invention may be used with various motors of various numbers of poles. FIGS. 5 and 6 illustrate two different embodiments of motors, both of which can be used with the speed control circuit in accordance with FIG. 3.

FIG. 5 illustrates a two-pole internal rotor motor 110, having two air gaps 111, 112 which, when developed, have similar profiles, for example, as illustrated in FIG. 2. FIG. 6 illustrates a four-pole external rotor motor 115 having four air gaps 116, 117, 118, 119. When developed, each of the four air gaps is similar to that disclosed in FIG. 2. Stator 13 has the approximate cross-sectional shape of a circle which is flattened at four, uniformly distributed positions along its circumference. In actual practice, these flattened regions can be rather small, and are illustrated in the drawings exaggerated for better visibility. The four flattened areas are in the space between the slots 120 and 123. The position of Hall generator 25 is illustrated both in FIGS. 5 and 6; it may be located as shown, or at any gap of the stator poles, or at an electrically equivalent position.

Various changes and modifications may be made within the scope of the inventive concept. In connection with the explanation given to explain FIG. 2, it should be emphasized that in actual practice a magnet having trapezoidal magnetization is preferred. In that case the magnetic effects are caused primarily by the regions between two adjacent rotor poles (G in FIG. 2), i.e. by the pole gaps. If the air gap decreases under a pole gap G, this corresponds to a braking reluctance torque, i.e. to the storage of magnetic energy, and if the air gap increases under a pole gap G, this corresponds to a driving reluctance torque. While the description given in connection with FIG. 2 has been given under the assumption of a concentrated magnetic pole 31, because this will greatly assist in understanding the principles of the present invention, it should be emphasized that in the case of trapezoidal magnetization there actually exists what might be termed a "concentrated magnetic gap" G. Referring to FIG. 2, it will thus be seen that in a motor having trapezoidal magnetication the angle $\beta$ will essentially determine the extent of the braking reluctance torque, and the angle $\delta$ will essentially determine the extent of the driving reluctance torque.

A typical motor, constructed in accordance with FIG. 1, may have the following characteristics:

```
stator average diameter:      42.5 mm
rotor internal diameter:      45   mm
minimum air gap, d₁:          0.5 mm
maximum air gap, d₂:          2.0 mm
angles   α: 30°         β: 145°
         γ:  5°         δ:  35°
``` windings 18 and 19 each 500 turns, connected to be energized to provide 720 ampere turns

```
axial length                              20 mm
average torque Mₙ              0.8' Ncm (≈80 cmp)
nominal speed at a supply voltage of 24 V
efficiency:                                70%
```

Suitable to drive a fan.

What is claimed is:

1. Brushless d-c motor having a permanent magnet rotor (11);
    a stator (13, 14, 15);
    a winding (18, 19) on the stator to generate an electromagnetic field when energized;
    and an air gap (26, 27, 111, 112, 116-119) separating the rotor and the stator;
    controlled semiconductor switching means (38, 39) controlling pulsed current flow through the winding;
    wherein the width of said air gap is non-uniform, in zones, so that the reluctance of the magnetic circuit which includes said stator, said air gap and said rotor varies with angular position over the circumference of the stator, said zones, in the direction of rotation of the motor being defined by:
    a zone of increasing width of the air gap and hence increasing reluctance of the magnetic circuit extending over a first angular range ($\alpha$) to a maximum ($d_2$), and then a zone of decreasing width of the air gap and hence decreasing reluctance of the magnetic circuit extending over a second angular range ($\beta$) to a minimum ($d_1$),
    and means (25) synchronizing pulsed energization of the semiconductor switching means and hence of the winding with the angular position of the rotor to generate, electrodynamically, an interrupted, pulsed electromagnetic torque during such pulsed energization of the winding by interaction of the magnet of the rotor with the electromagnetic field, due to energization of the winding and to store during such pulsed energization of the winding a portion of said generating torque in form of magnetic reluctance torque by interaction of the magnet of the rotor with the magnetic structure of the stator when the magnet of the rotor is in an angular range which includes at least part of said zone of increasing width of the air gap, the reluctance torque stored in magnetic form being released to the rotor, during pulse gaps, or interruptions in the generated electromagnetic field, by interaction of the magnet of the rotor with the magnetic structure of the stator when the magnet of the rotor is in an angular range which includes at least part of said zone of decreasing width of the air gap, the alternating component of the electrodynamically generated torque and the magnetic reluctance torque being in phase opposition and, together, providing a net driving torque to the rotor upon its rotation with respect to the stator.

2. Motor according to claim 1, wherein the first angular range ($\alpha$) is approximately 10° to 100°-electrical.

3. Motor according to claim 1, wherein the air gap decreases from a maximum ($d_2$) at the beginning of the second angular range ($\beta$) approximately monotonically to a minimum ($d_1$), said minimum being located by a third angle ($\gamma$) in advance of the center of the electromagnetic field when the winding is energized.

4. Motor according to claim 3, wherein said second angular range ($\beta$) is about 80°-160°-electrical.

5. Motor according to claim 3, wherein said third angular range ($\gamma$) is from 0° to 30°-electrical.

6. Motor according to claim 3, wherein the air gap increases approximately monotonically in a fourth angular range ($\delta$) to the maximum ($d_2$), said fourth range including said first angular range ($\alpha$).

7. Motor according to claim 6, wherein said fourth angular range ($\delta$) is about 20°-100°-electrical.

8. Motor according to claim 1, wherein the motor is a two-pole external rotor motor and the stator (13) has approximately elliptical cross section.

9. Motor according to claim 8, wherein the main axis (32) of the ellipse includes an angle ($\epsilon$) having a value between about 40°-80°-electrical, with an axis (33) passing through the center of the stator poles.

10. Motor according to claim 1 (FIG. 5), wherein the motor is a two-pole internal rotor motor and the stator is formed with an internal essentially cylindrical space in which the rotor may turn, which space is approximately elliptical in cross section.

11. Motor according to claim 1 (FIG. 6), wherein the stator of the motor has a circumference facing the air gap which has portions flattened with respect to a complete circle coaxial with the motor.

12. Motor according to claim 11, wherein the motor is a four-pole motor and the stator structure has four flattened portions uniformly distributed above the circumference of the stator;
    the windings are located in winding slots (120-123), said slots being located at portions of the rotor between said flattened portions.

13. Motor according to claim 1, wherein the synchronization means (25) comprises a magnetic semiconductor sensing means located at an angular position corresponding to that between adjacent stator poles.

14. Motor according to claim 1, wherein the permanent magnet rotor (11) has approximately sinusoidal distribution of magnetism.

15. Motor according to claim 1, wherein the permanent magnet rotor (11) has approximately trapezoidal distribution of magnetism.

16. Motor according to claim 1, wherein the permanent magnetic rotor has approximately rectangular-shaped distribution of magnetization.

17. Motor according to claim 1, wherein the synchronizing means comprises a magnetic sensing element (25) and a speed controller circuit (FIG. 3) including the sensing element, said circuit controlling the semiconductor switching means (38, 39) to interrupt energization of the winding before the theoretical commutation instant sensed by the sensing element and to re-energize the winding after the theoretical commutation instant sensed by the sensing element.

18. Motor according to claim 17, wherein the winding is a two-part winding and the duration of energization of any part of the winding at the desired speed is less than 120°-electrical to generate a driving torque ($M_{el}$).

19. Motor according to claim 17, wherein the driving torque ($M_{el}$) generated during energization of the winding and the torque ($M_{rel}$) released or delivered by stored magnetic energy are substantially complementary, whereby the added instantaneous values provide a substantially uniform output torque.

20. Motor according to claim 1, wherein the synchronizing means comprises
magnetic sensing means (25) and a control circuit comprising
means (68, 69) sensing induced a-c voltages in the stator winding during operation of the motor;
means (85) phase-shifting the sensed a-c voltages;
and means (100, 84) deriving a control signal to energize the semiconductor switching means in dependence on a characteristic of the phase-shifted voltage.

21. Motor according to claim 20, wherein the phase-shift means (85) comprises means shifting the phase of the induced a-c voltages by about 180°-electrical.

22. Motor according to claim 20, wherein the phase-shift means (85) comprises a multi-stage filter.

23. Motor according to claim 22, wherein the multi-stage filter comprises a plurality of series-connected R-C circuits.

24. Motor according to claim 20, further comprising voltage reference means (95) and wherein said characteristics comprise a comparison of amplitude of the phase-shifted voltage with respect to the reference means.

25. Motor according to claim 24, wherein the comparison level is adjustable.

26. Motor according to claim 20, wherein the phase-shift means comprises a multi-stage filter (85) and a control amplifier connected thereto.

27. Motor according to claim 20, further comprising a temperature sensitive element (87) included in the control circuit, said temperature sensitive element being dimensioned to compensate for temperature dependency of remanent induction of the permanent magnetic rotor.

28. Motor according to claim 20, wherein the means sensing the induced voltage comprises a multi-phase half-wave rectifier (68, 69).

29. Brushless d-c permanent magnet rotor and control circuit combination comprising
a stator having at least one winding thereon to selectively energize at least two poles, in respective directions of magnetization;
semiconductor control means selectively energizing the winding, alternately, in respective directions of magnetization in pulses, leaving pulse gaps between energizing pulses;
a permanent magnet rotor opposed to the poles of the stator;
an air gap separating the rotor and the stator poles, said air gap being characterized in that progressing in the direction of rotation of the motor, the air gap has a first zone of increasing width, so that the reluctance of the magnetic path between rotor and stator increases in said first zone, said first zone extending over a first angular range ($\alpha$) to a maximum ($d_2$), and the air gap has a second zone of decreasing width, so that the reluctance of said magnetic path then decreases in said second zone, said second zone extending over a second angular range ($\beta$) to a minimum ($d_1$), to store magnetic energy by interaction of the magnetism of the rotor with the magnetic structure of the stator when a pole of the rotor is in said first zone and to release the stored energy in the form of delivered torque by interaction of the permanent magnetism of the rotor with the magnetic structure of the stator when a pole of the rotor is in said second zone;
magnetic sensing means sensing the angular position of a pole of the rotor with respect to the winding on the stator;
a control circuit responsive to and connected to said magnetic sensing means and controlling said semiconductor control means to energize the winding in respective direction of current flow and generate a magnetic field, in alternate direction, in synchronism with the position of a pole of the rotor in said first zone, and to de-energize the winding when the pole of the rotor is in the second zone, to generate electrodynamically, an interrupted pulsed torque having an alternating component in phase opposition to the torque applied to the rotor as the magnets of the rotor interact with the respective zones of the magnetic structure.

30. Motor and control circuit combination as in claim 29, further comprising
speed control means comprising
means deriving a signal representative of motor speed;
command means connected to said signal deriving means and delivering a speed command signal;
and means controlling the duration of energization of said winding by said semiconductor control means in dependence on said speed command signal.

31. Motor and control circuit combination as in claim 29, wherein the air gap decreases from a maximum ($d_2$) at the beginning of the second angular range ($\beta$) approximately monotonically to a minimum ($d_1$), said minimum being located by a third angle ($\gamma$) in advance of the center of the electromagnetic field when the winding is energized.

32. Motor and control circuit combination as in claim 31, wherein said control circuit controls said semiconductor control means to energize the winding in respective direction of current flow when a pole of the rotor has rotated beyond said third angle ($\gamma$) and while said pole is still in said first zone.

33. Motor and control circuit combination as in claim 29, wherein the permanent magnet rotor (11) has approximately sinusoidal distribution of magnetism.

34. Motor and control circuit combination as in claim 29, wherein the permanent magnet rotor has approximately trapezoidal distribution of magnetism.

35. Motor as in claim 1, wherein the synchronization means (25) comprises a magnetic field sensing means located at an angular position corresponding to that between adjacent stator poles.

* * * * *